(12) United States Patent
Popov et al.

(10) Patent No.: US 7,982,349 B2
(45) Date of Patent: Jul. 19, 2011

(54) SPINDLE MOTOR HAVING A FLUID DYNAMIC BEARING SYSTEM AND A STATIONARY SHAFT

(75) Inventors: Vladimir V. Popov, Villingen-Schwenningen (DE); Jurgen Fleig, St. Georgen (DE); Martin Bauer, Villingen-Schwenningen (DE); Guido Schmid, Triberg (DE); Olaf Winterhalter, Epfendorf (DE); Mathias Wildpreth, Villingen-Schwenningen (DE); Thomas Fuss, Rottweil (DE); Martin Engesser, Donaueschingen (DE); Stefan Schwamberger, Lohsa Ot. Hermsdorf (DE)

(73) Assignee: Minebea Co., Ltd., Nagano-Ken (JP)

( * ) Notice: Subject to any disclaimer, the term of this patent is extended or adjusted under 35 U.S.C. 154(b) by 209 days.

(21) Appl. No.: 12/313,898

(22) Filed: Nov. 25, 2008

(65) Prior Publication Data
US 2009/0140587 A1    Jun. 4, 2009

(30) Foreign Application Priority Data

Nov. 30, 2007  (DE) ................ 10 2007 058 150
Sep. 19, 2008  (DE) ................ 10 2008 048 079
Oct. 21, 2008  (DE) ................ 10 2008 052 469

(51) Int. Cl.
*H02K 5/16*  (2006.01)
(52) U.S. Cl. ............................................. 310/90
(58) Field of Classification Search ............. 310/90, 310/51; 384/100
See application file for complete search history.

(56) References Cited

U.S. PATENT DOCUMENTS

| | | | |
|---|---|---|---|
| 5,623,382 A | 4/1997 | Moritan | |
| 6,183,135 B1 * | 2/2001 | Kloeppel et al. | 384/112 |
| 6,371,650 B1 | 4/2002 | Goto | |
| 6,397,470 B1 | 6/2002 | Saichi | |
| 6,404,087 B1 | 6/2002 | Ichiyama | |
| 6,900,567 B2 | 5/2005 | Aiello | |
| 6,982,510 B1 * | 1/2006 | Ajello et al. | 310/90 |
| 6,991,376 B2 | 1/2006 | Aiello | |
| 7,056,024 B2 * | 6/2006 | Weingord et al. | 384/100 |
| 7,133,250 B2 * | 11/2006 | Herndon et al. | 360/99.08 |
| 7,234,868 B2 | 6/2007 | Tiller | |
| 2005/0207060 A1 | 9/2005 | Leblanc | |
| 2006/0222276 A1 * | 10/2006 | Uenosono | 384/107 |
| 2007/0133911 A1 | 6/2007 | Nishimoto | |
| 2007/0210654 A1 | 9/2007 | Ueda | |

FOREIGN PATENT DOCUMENTS

| | | |
|---|---|---|
| DE | 102005005414 | 10/2006 |
| DE | 102007005516 | 8/2008 |
| DE | 102008052469 | 6/2009 |
| JP | 2003333798 | 11/2003 |

* cited by examiner

*Primary Examiner* — Nguyen N Hanh
(74) *Attorney, Agent, or Firm* — Cooper & Dunham LLP

(57) ABSTRACT

The invention relates to a spindle motor having a fluid dynamic bearing system comprising axial and radial bearings that contains a rotor component (14) which encloses a stationary shaft (12), which in turn is connected at both its ends to axially aligned bearing parts (16; 18) that are fashioned such that they form capillary sealing gaps (32; 34), a recirculation channel (28) filled with bearing fluid that connects the remote regions of the bearing to each other, and an electromagnetic drive system (42, 44) for driving the rotor component.

31 Claims, 10 Drawing Sheets

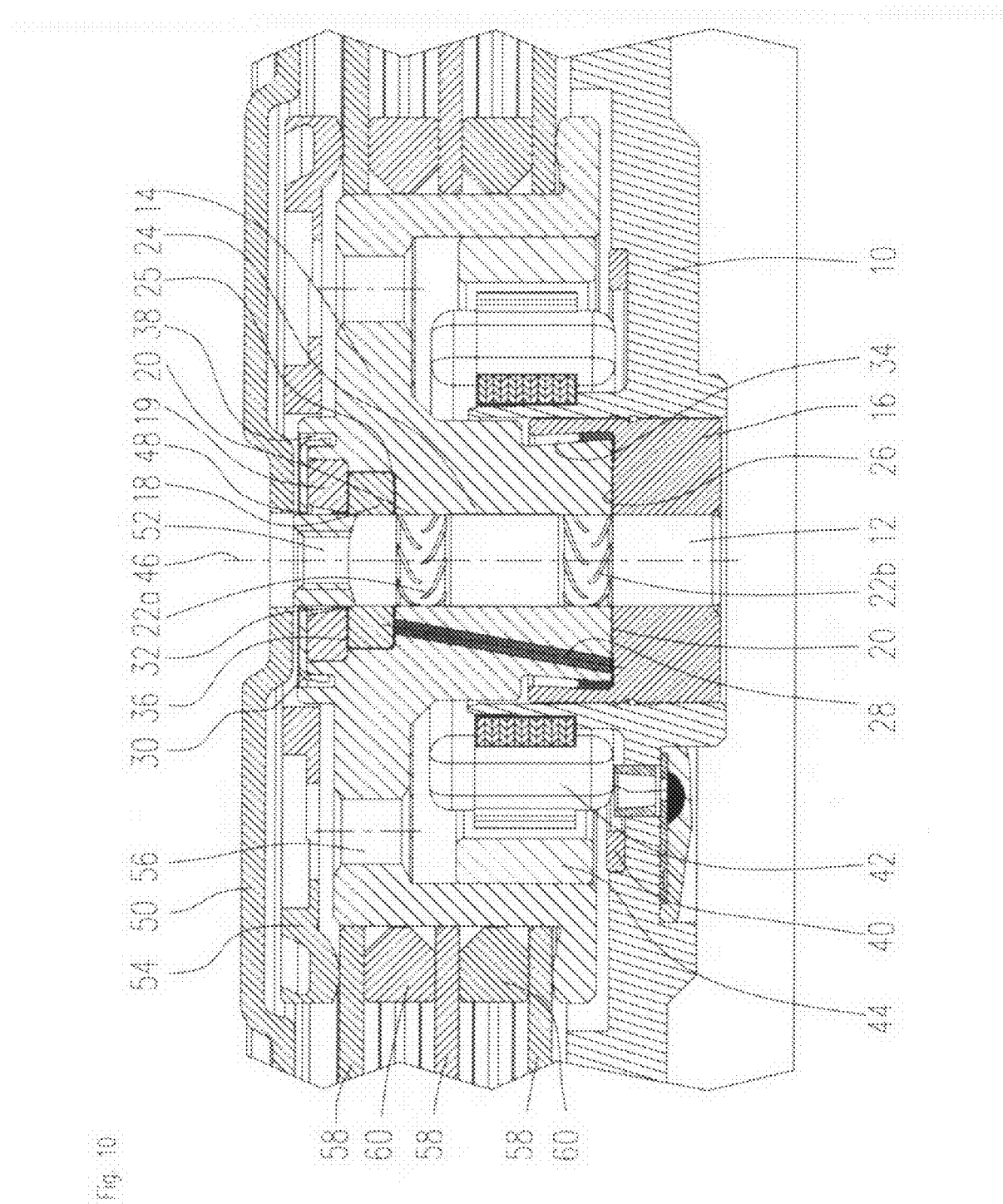

SPINDLE MOTOR HAVING A FLUID DYNAMIC BEARING SYSTEM AND A STATIONARY SHAFT

BACKGROUND OF THE INVENTION

The invention relates to a spindle motor having a fluid dynamic bearing system and a stationary shaft.

DESCRIPTION OF PRIOR ART

Spindle motors having a fluid dynamic bearing system are used, for example, for driving hard disk drives and can generally be divided into two different groups, that is to say designs: motors having a rotating shaft and a bearing system usually open at only one end (e.g. a single plate design) and motors having a stationary shaft. An important advantage afforded by spindle motors having a stationary shaft is the possibility of fastening the shaft at each end, to the baseplate and to the motor housing respectively. This gives these kinds of motors significantly greater structural stiffness making them particularly suitable, for example, for hard disk drives that have increased or special requirements, as occur nowadays for many mobile applications with ever increasing data densities along with vibrations occurring during normal operation. Another important area of application is in hard disk drives that require a particularly low level of operating noise, where greater structural stiffness can especially reduce the transmission and radiation of vibrations generated by the electromagnetic forces of the motor.

In order to prevent bearing fluid from leaking out of the bearing, the construction, and particularly the sealing, of a spindle motor having a stationary shaft and a fluid dynamic bearing system open at both ends are usually more complex than for a spindle motor having a rotating shaft. For a bearing gap open at both ends, there is moreover an increased risk of air penetrating into the bearing gap and impairing the function of the bearing system. Measures have therefore to be taken to prevent air from penetrating into the bearing gap and/or to transport air out of the bearing gap or out of the bearing fluid respectively.

SUMMARY OF THE INVENTION

It is the object of the invention to provide a spindle motor that contains a fluid dynamic bearing system having a stationary shaft fixed at both ends and that consists of only a few parts that are relatively easy to manufacture. Another object is to facilitate the discharge of any air bubbles found in the bearing gap.

This object is achieved by providing a spindle motor according to the invention which comprises a stationary shaft that is held in a baseplate, either directly or indirectly using an additional flange member, a rotor component supported rotatably about a rotational axis with respect to the shaft, a bearing gap open at both ends that is filled with a bearing fluid and that separates the adjoining surfaces of the shaft, the rotor component and at least one first bearing part from one another, a first radial bearing and a second radial bearing formed between the opposing axially extending bearing surfaces of the shaft and the rotor component, an axial bearing formed between the opposing radially extending bearing surfaces of the rotor component and the first bearing part connected to the baseplate, a recirculation channel filled with bearing fluid that connects the remote regions of the bearing to each other and an electromagnetic drive system for driving the rotor component.

The invention also claims for a hard disk drive comprising such a spindle motor for rotatably driving at least one storage disk.

Preferred embodiments and further advantageous characteristics of the invention are revealed in the dependent claims.

In a preferred embodiment of the invention, the bearing system comprises a total of only four mechanical components, three of the components being stationary components and only one rotating, mechanical rotor component taking the form of a hub/bearing bush arrangement being provided. Such a small number of parts makes the bearing system very simple to construct and in particular makes it possible to manufacture the parts relatively easily and at low cost and to machine them with low tolerance. It is possible to reduce the number of parts still further by forming one of the two bearing parts integrally with the shaft.

According to the invention, various sealing concepts are provided for sealing the bearing gap that is open at both ends. In one concept, the rotor component can have surfaces fashioned such that they form a capillary gap seal together with the surfaces of a bearing part. The gap seal can be formed between an inner circumferential surface of the rotor component and an outer circumferential surface of the respective bearing part. Conversely, it is also possible for the gap seal to be formed between an outer circumferential surface of the rotor component and an inner circumferential surface of the bearing part. Depending on the design and space situation in the bearing, the gap seal may be aligned vertically or horizontally to the rotational axis. In the case of spindle motors for high rotational speeds, it is preferable if the capillary seal is disposed vertically so that the centrifugal forces acting on the bearing fluid exert less influence on the bearing fluid in the capillary seal.

Ideally, the walls defining the capillary seals are slanted so that the capillary seal narrows in the direction of the bearing gap and that the center line of the sealing gap extending in the direction of the bearing gap has an increasingly large spacing to the rotational axis in a radial direction, so that the fluid pressure in the bearing fluid increases due to the centrifugal force that acts in the direction of the bearing gap.

Optionally, the gap seal can be augmented by a dynamic pumping seal which is formed between the opposing radially extending surfaces of the rotor component and a second bearing part connected to the shaft. The surfaces of the rotor component and of a bearing part forming the seal having appropriate pumping patterns that, on rotation of the bearing, generate a pumping effect on the bearing fluid directed towards the interior of the bearing and that compensate any counter pressure of all the bearing patterns thus preventing bearing oil from leaking out of the bearing gap, despite the adjacent gap seal or capillary seal respectively having a comparatively short overall axial length.

To allow bearing fluid to circulate in the fluid bearing, the rotor component comprises a recirculation channel which connects the radially extending sections of the bearing gap or sealing gaps to each other. The recirculation channel is preferably disposed such that it connects the sealing gap radially outside the axial bearing to a section of the bearing gap located radially within the upper sealing gap or the dynamic pumping seal. In this case, the recirculation channel is inclined, i.e. not parallel, to the rotational axis. Using the recirculation channel, the sealing gap radially outside the axial bearing can also be connected to a section of the bearing gap located radially outside the dynamic pumping seal.

In a preferred embodiment of the invention, the recirculation channel is inclined at an acute angle to the rotational axis. Due to the inclined recirculation channel a centrifugal force is exerted on the bearing fluid when the rotor component is in rotation. The centrifugal force within the recirculation channel accelerates the bearing fluid in the same direction as does the overall pumping force which is generated by the axial bearing and the two radial bearings. The pumping force generated by the centrifugal force is directed towards the axial bearing and preferably twice as strong as the overall pumping force exerted on the bearing fluid in the same direction and generated by the axial bearing and the two radial bearings.

In one embodiment of the invention, the surfaces of the rotor component and the bearing part, which form the capillary seal, are preferably parallel to the rotational axis or inclined at an acute angle to the rotational axis. The respective angles of the surfaces defining the capillary gap have to differ in size, thus producing a capillary seal having a tapered cross-section.

One embodiment of the invention provides for the capillary seal to be covered by an annular cover connected to the rotor component, the annular cover forming a labyrinth seal together with a bearing part. This goes to improve the reliability that bearing fluid will not leak out of the capillary seal. The annular cover may of course also be disposed on the bearing part.

According to another embodiment of the invention, the cover may be so formed and fixed onto or into the rotor component that its inside circumference, together with an outside circumference of the associated bearing part, defines the sealing gap of the capillary seal.

The invention will now be described in more detail on the basis of three embodiments with reference to the drawings. Further advantages and characteristics of the invention can be derived from the following description.

BRIEF DESCRIPTION OF THE DRAWINGS

FIG. 10 shows a section through a ninth embodiment of the spindle motor according to the invention.

DESCRIPTION OF PREFERRED
EMBODIMENTS OF THE INVENTION

Figure 1:
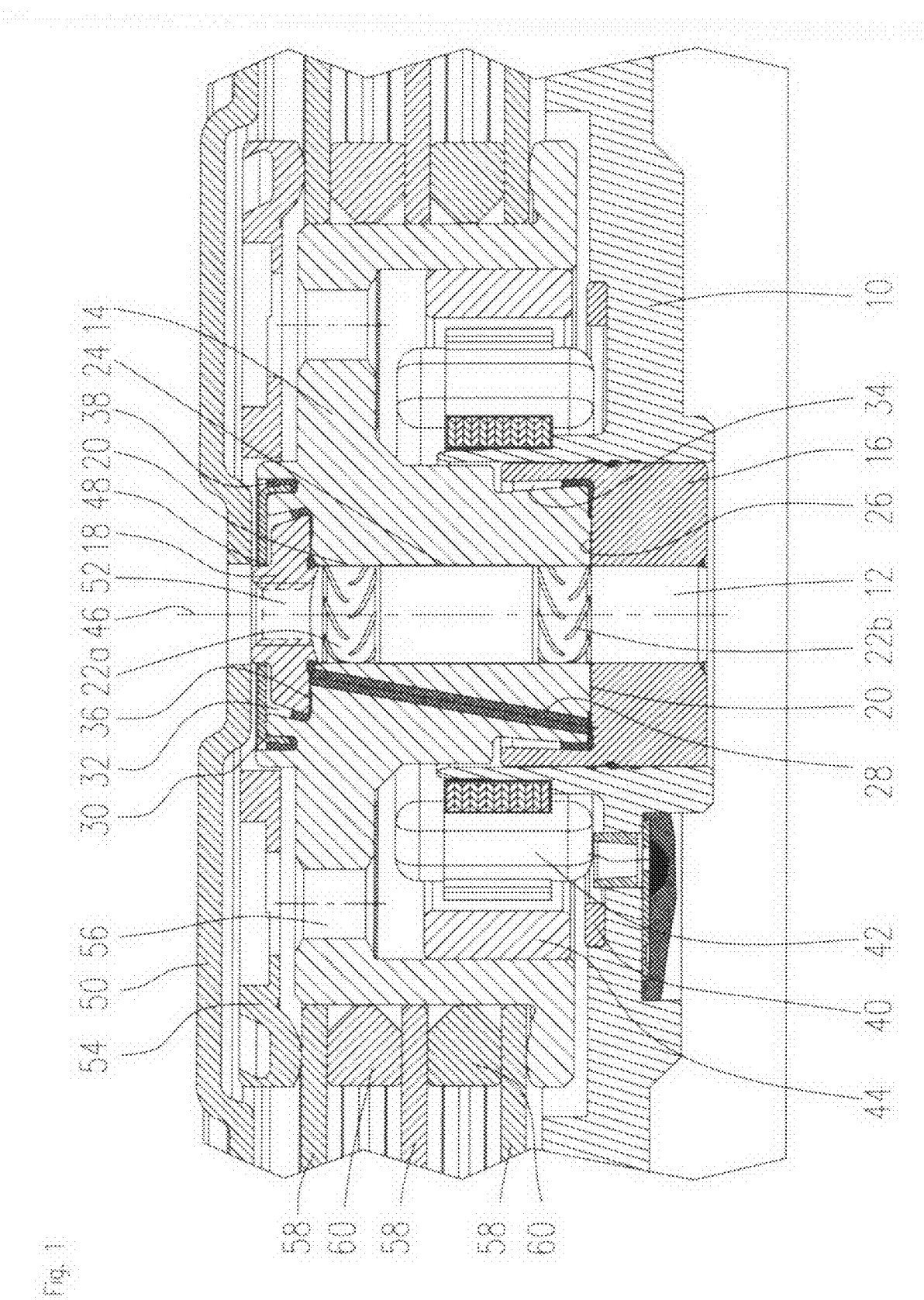
FIG. 1 shows a section through a first embodiment of the spindle motor according to the invention.
Figure 2:
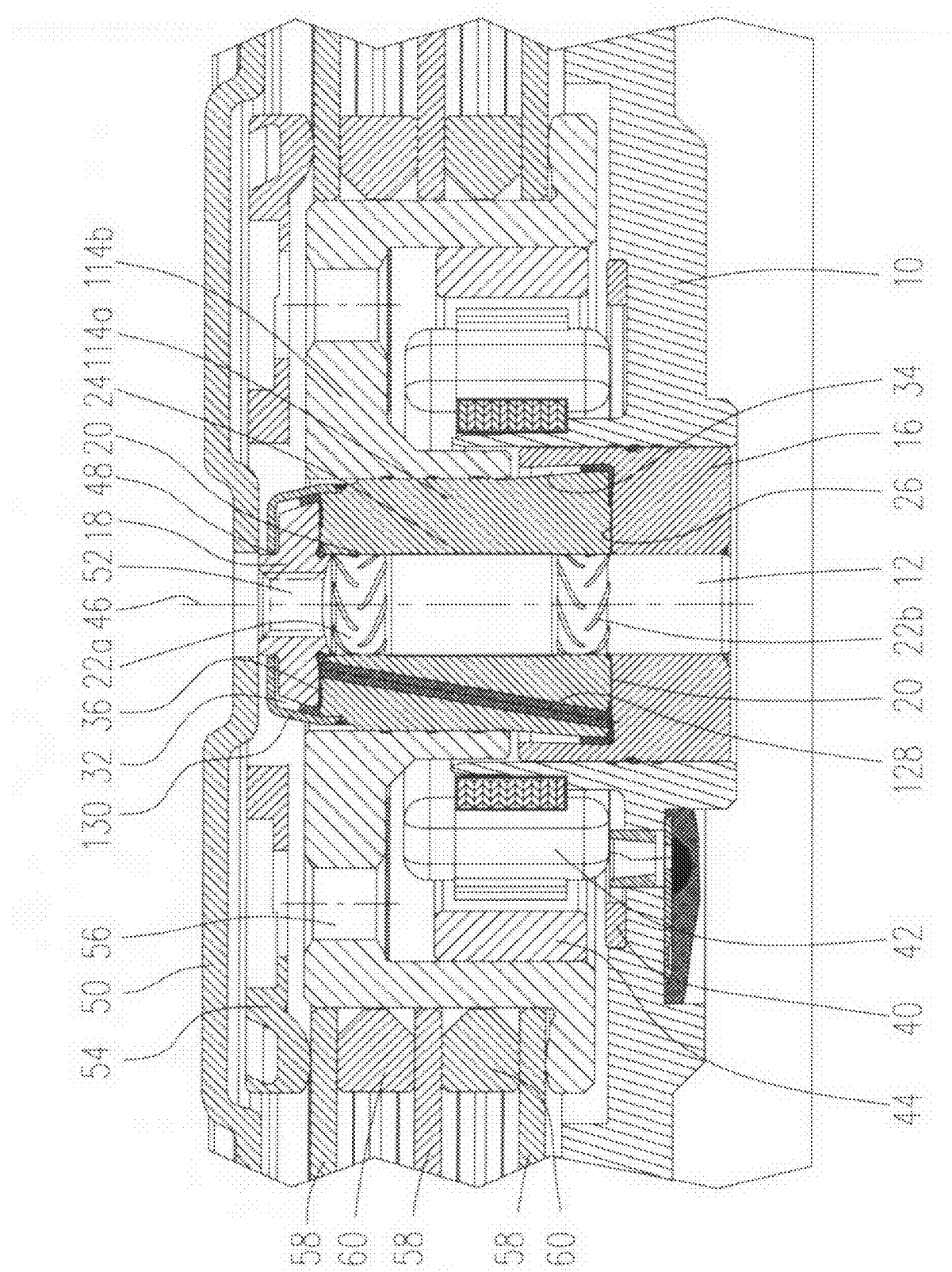
FIG. 2 shows a section through a second embodiment of the spindle motor according to the invention.

FIGS. 1 and 2 show two embodiments of a spindle motor according to the invention that essentially have the same basic construction. The spindle motors could be used for driving the storage disks of a hard disk drive.

The spindle motor according to FIG. 1 comprises a baseplate 10 that has a substantially central cylindrical opening in which a first bearing part 16 is accommodated. The first bearing part 16 is approximately cup-shaped in form and comprises a central opening in which the shaft 12 is fixed. A second bearing part 18 is disposed at an upper end of the stationary shaft 12, the second bearing part 18 being preferably annular in shape and formed integrally with the shaft 12. The said components 10, 12, 16 and 18 form the stationary components of the bearing system of the spindle motor. The shaft 12 has a tapped hole 52 at its upper end for the purpose of fixing it to a housing cover 50 of the spindle motor or of the hard disk drive respectively. The spindle motor comprises a single-piece rotor component 14 that is disposed in a space formed by the shaft 12 and the two bearing parts 16, 18, rotatable with respect to these components. The rotor component is approximately U-shaped in cross-section. The upper bearing part 18 lies in an annular recess in the rotor component 14. Adjoining surfaces of the shaft 12, the rotor component 14 and the bearing parts 16, 18 are separated from one another by a bearing gap 20 open at both ends that is filled with a bearing fluid, such as bearing oil. The electromagnetic drive system of the spindle motor is formed in a well-known manner by a stator arrangement 42 disposed on the baseplate 10 and an annular permanent magnet 44 enclosing the stator arrangement at a spacing, the permanent magnet being disposed on an inner circumferential surface of the rotor component 14.

The rotor component 14 of the spindle motor has a hollow cylindrical section that is designed in such a way that its inside circumference forms two cylindrical bearing surfaces that are separated by a circumferential groove 24 in between. These bearing surfaces enclose the stationary shaft 12 at a distance of only a few micrometers while forming the bearing gap 20 and are provided with suitable grooved patterns, so that, together with the respective opposing bearing surfaces of the shaft 12, they form two fluid dynamic radial bearings 22a and 22b.

A radially extending section of the bearing gap 20 adjoins the lower radial bearing 22b, the radially extending section of the bearing gap being formed by radially extending bearing surfaces of the rotor component 14 and corresponding opposing bearing surfaces of the bearing part 16. These bearing surfaces form a fluid dynamic axial bearing 26 having bearing surfaces taking the form of circular rings perpendicular to the rotational axis 46. The fluid dynamic axial bearing 26 is marked in a well-known manner by spiral-shaped grooved patterns that may be provided either on the rotor component 14, on the bearing part 16 or on both parts. The grooved patterns of the axial bearing 26 preferably extend over the entire end face of the rotor component, i.e. from the inside rim to the outer rim. This goes to produce a defined distribution of pressure in the entire axial bearing gap and negative pressure zones are avoided since fluid pressure continuously increases from a radially outer to a radially inner position of the axial bearing. Due to this radially-outwards declining pressure gradient, any gases contained in the bearing fluid are transported radially outwards. All the grooved patterns needed for the radial bearings 22a, 22b and for the axial bearing 26 are advantageously disposed on the rotor component 14, which goes to simplify the manufacture of the bearing, particularly the shaft 12 and the bearing part 16, since all the patterns can be made in a single operation.

A sealing gap 34 proportionally filled with bearing fluid adjoins the radial section of the bearing gap 20 in the region of the axial bearing 26, the sealing gap 34 being formed by the opposing surfaces of the rotor component 14 and the bearing part 16 and sealing the end of the fluid bearing system on this side. The sealing gap 34 comprises a radially extending section wider than the bearing gap 20 that merges into a tapered section extending almost axially which is defined by an outer circumferential surface of the rotor component 14 and an inner circumferential surface of the bearing part 16. Alongside its function as a capillary seal, the sealing gap 34 acts as a fluid reservoir, making available the amount of fluid necessary for the useful life of the bearing system after fluid is lost from the bearing gap by evaporation. Moreover, filling tolerances and any thermal expansion of the bearing fluid can be compensated. The two surfaces on the rotor component 14 and the bearing part 16 forming the tapered section of the sealing gap 34 may each be inclined inwards with respect to the rotational axis 46. On rotation of the bearing, this causes the bearing fluid to be pressed towards the interior in the direction of the bearing gap 20 due to the centrifugal force.

At the other end of the fluid bearing system, the rotor component 14 adjoining the upper radial bearing 22a is designed such that it forms a radially extending surface that, together with a corresponding opposing surface of the bearing part 18, forms a narrow gap whose width is wider than the width of the bearing gap 20 in the region of the radial bearing. In the region of this gap, a dynamic pumping seal 36 can optionally be disposed that is marked by suitable pumping patterns taking the form of spiral grooves on the surfaces of the rotor component 14, the bearing part 18 or both, and seals the fluid bearing system at this end. The pumping seal 36 widens at the outer end and leads into a sealing gap 32 preferably having a tapered cross-section. The sealing gap 32 extends substantially axially and is defined by the opposing surfaces of the rotor component 14 and the bearing part 18 that are preferably inclined inwards with respect to the rotational axis 46. On rotation of the bearing, this causes the bearing fluid to be pressed towards the interior in the direction of the bearing gap 20 due to the centrifugal force. The sealing gap 32 may be covered by an annular cover 30. The cover 30 is held in an annular groove 38 in the rotor component 14 and bonded in place, for example. Together with the end of the shaft 12, the cover 30 forms a labyrinth seal 48, by means of which the exchange with air and thus the evaporation of bearing fluid is reduced. This goes to improve the reliability that bearing fluid will not leak out of the sealing gap 32. The annular cover may also of course be disposed on the shaft 12 and form a labyrinth seal with the rotor component 14.

In order to fulfill the described functions and to ensure a simple motor assembly, the two bearing parts 16, 18, which are fixedly connected to the shaft 12 by means, for example, of an integral design or by pressing, bonding or welding, must of course be suitably designed. It may be particularly favorable to design one of the two bearing parts, part 16 for example, to be cup-shaped with a raised rim, so that, together with an opposing surface of the rotor component 14, it forms a sealing gap 34 of a capillary gap seal at its inner circumferential surface, and at the outside circumference it can be connected to the baseplate 10. On the other hand, the simplest possible design for the bearing parts 16, 18 may be advantageous, such as a chamfered or even a straight circular disk, like bearing part 18 for example.

To ensure continuous flushing of the bearing system with bearing fluid, the rotor component 14 is provided with a recirculation channel 28. The recirculation channel 28 connects the radial section of the sealing gap 34 located radially outside the axial bearing 26 to a radially extending section of the bearing gap radially within the dynamic pumping seal 36, i.e. the section of the bearing gap between the pumping seal 36 and the first radial bearing 22a. The recirculation channel 28 can be easily realized, for example, by drilling through the rotor component 14 at an angle to the rotational axis 46 of the motor. In doing so, the recirculation channel 28 is inclined at an angle of approximately 10 degrees to the rotational axis 46. The upper end of the recirculation channel 28 lies radially within the pumping seal 36. This means that in the region of the opening of the recirculation channel 28 higher pressure prevails than, for example, in the sealing gap 32, so that any air bubbles found in the bearing gap in the region of the opening of the recirculation channel 28 are transported radially outwards due to the falling pressure gradient, whereas the bearing fluid is transported radially inwards due to the effect of the pumping seal 36. The inclined arrangement of the recirculation channel 28 and the different pressure conditions at the opposing ends of the recirculation channel 28 favor the discharge of air bubbles out of the bearing fluid.

The radial bearings each consist of a number of half-sine-shaped bearing grooves that pump the bearing fluid axially upwards or downwards respectively. Due to the varying lengths of the bearing grooves, asymmetric shaped radial bearings are produced that have an overall pumping direction, which, even in the case of a bearing bore that, due to manufacturing tolerances, deviates from a cylindrical shape and is slightly tapered in the region of the radial bearing gap, is always directed axially upwards in the direction of the second bearing part 18. The axial bearing 26 preferably has spiral-shaped bearing grooves that pump the bearing fluid radially inwards. When the bearing is in operation, centrifugal forces act on the bearing fluid found within the recirculation channel, so that it is pressed axially downwards thus producing a recirculation of bearing fluid within the fluid bearing.

Since the entire rotor of the spindle motor (apart from magnet 44 and a cover 30 where applicable) preferably consists of only the rotor component 14, the position tolerance with respect to the fluid bearing of the rotor surfaces, which act, for example, as supporting surfaces for the storage disks of a hard disk drive, is better than for a rotor consisting of several parts, and the mechanical stability is considerably greater. Moreover, the functional surfaces (bearing surfaces) of the fluid bearing system, all of which are located on one part, preferably the rotor component 14, can be relatively easily manufactured to the required precision. In particular, compared, for example, to a considerably smaller bearing bush of a conventional design, the rotor component 14 can be relatively easily clamped into a chuck and the final processing of almost all the bearing surfaces can be carried out without having to rechuck. What is more, it is now possible to dispense with the assembly of the rotor from several separate parts, which is difficult particularly for small form factors and inevitably associated with stoppages, and where the separate parts together have to incorporate all the functional surfaces necessary for a fluid bearing system with the required precision and additional, specially designed close-tolerance connecting regions.

Because the bearing is mounted in the first bearing part 16, which acts as a flange for connection to the baseplate 10, it is possible to mount the fluid bearing as a structural unit, to fill it with bearing fluid and to test it before the fluid bearing is connected as a structural unit to the baseplate 10.

Since the spindle motor has only one fluid dynamic axial bearing 26 that generates a force in the direction of the second bearing part 18, a corresponding counterforce or preload force has to be provided that holds the bearing system in axial balance. For this purpose, the baseplate 10 may have a ferromagnetic ring 40 that lies axially opposite the rotor magnet 44 and is magnetically attracted by the rotor magnet. This magnetic force of attraction acts in opposition to the force of the axial bearing 26 and keeps the bearing axially stable.

As an alternative or in addition to this solution, the stator arrangement 42 and the rotor magnet 44 may be disposed at an axial offset with respect to one another in such a way that the rotor magnet 44 is disposed axially further away from the baseplate 10 than the stator arrangement 42. Through the magnetic system of the motor, an axial force is thereby built up that acts in the opposite direction to the axial bearing 26.

The outer cup-shaped part of the rotor component 14 is provided for the purpose of attaching the storage disks 58 of the hard disk drive. The annular disk-shaped storage disks 58 rest on a lower, radially outwards aligned collar of the rotor component 14 and are separated from one another by spacers 60. The storage disks 58 are held by a holding piece 54 that is fixed by means of screws in tapped holes 56 in the rotor component 14.

In FIG. 2 a spindle motor is illustrated in which identical components or components having the same functions as those in FIG. 1 are provided with the same reference numbers. The spindle motor according to FIG. 2 essentially differs from the spindle motor according to FIG. 1 by having a two-piece rotor component and a different design for the upper seal. Substantially the same description applies to FIG. 2 as for the spindle motor in FIG. 1.

In FIG. 2, the rotor component 114 is formed in two pieces and comprises an inner, approximately cylindrical rotor component 114a and an outer approximately cup-shaped rotor component 114b. The inner rotor component 114a encloses the shaft 12 and, together with the shaft, forms the two radial bearings 22a, 22b. An end face of the inner rotor component 114a lies opposite a radial surface of the first bearing part 16 and, together with the first bearing part 16, forms the axial bearing 26. The dynamic pumping seal 36 is formed by an end face of the inner rotor component 114a and an opposing surface of the second bearing part 18, at least one of the two surfaces being provided with pumping patterns. Outside the pumping seal 36, the sealing gap 32 adjoins, which is defined by an inner circumferential surface of a cup-shaped cover 130 and an outer, chamfered circumferential surface of the second bearing part 18. The cover 130 is mounted on the end face of the inner rotor component 114a and welded, for example, to this component. An annular labyrinth gap 48 remains between an inside edge of the cover 130 and the bearing part 18 (or the shaft 12 respectively), the labyrinth gap additionally sealing the capillary seal towards the outside.

The sealing gap 34 adjoining the axial bearing 26 is defined by the outside circumference of the inner rotor component 114a and the inside circumference of the cup-shaped first bearing part 16. The recirculation channel 128 extends within the inner rotor component 114a and connects the sealing gap 34 in the region of the outside diameter of the axial bearing 26 to a section of the bearing gap radially within the pumping seal 36. The recirculation channel 128 is inclined at an angle of approximately 10 degrees with respect to the rotational axis 46.

The inner rotor component 114a takes on the function of a bearing bush and the outer, cup-shaped rotor component 114b has the function of a hub that carries the magnet 44 of the drive system and the components to be driven, such as the storage disks 58, as described in conjunction with FIG. 1.

Figure 3:
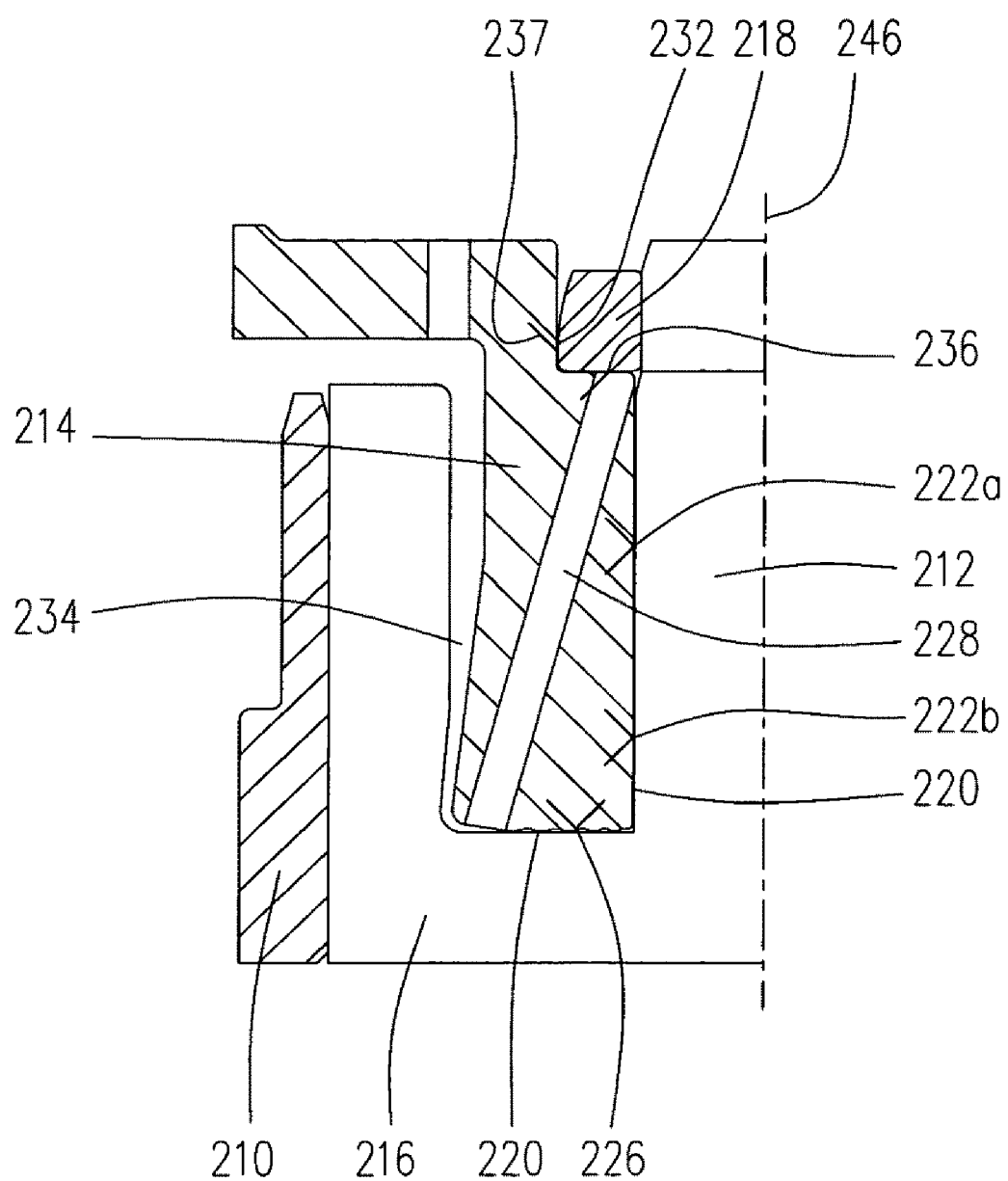
FIG. 3 shows a section through a third embodiment of the spindle motor according to the invention.

FIG. 3 shows an enlarged section through a bearing system of a spindle motor according to the invention. In this embodiment, the shaft 212 and the first bearing part 216 are integrally formed as one piece. The rotor component 214 is disposed rotatable about the rotational axis 246 in an annular space formed by the shaft 212 and the first bearing part 216. The first bearing part 216 is fixedly connected at its outside circumference to the base 210 of the motor. Two radial bearings 222a, 222b are disposed between bearing surfaces on the inside circumference of the rotor component 214 and on the outside circumference of the shaft 212 and separated from one another by an axial section of the bearing gap 220. An axial bearing 226 is disposed along a radial section of the bearing gap 220, the axial bearing being formed by bearing surfaces on the end face of the rotor component 214 or on a bottom surface of the first bearing part 216 respectively. The axial section of the bearing gap 220 merges into a sealing gap 232 that has a radially extending section and an axially extending section and is defined by surfaces of a second bearing part 218 disposed on the shaft 212 and the opposing surfaces of the rotor component 214.

The sealing gap 232 is partially filled with bearing fluid and forms a tapered gap seal. A cover to cover the sealing gap and to restrain the bearing fluid is not provided here. In the region of the sealing gap 232, one or more pumping seals 236 or 237 may be disposed that are located in the horizontally or in the vertically extending gap between the second bearing part 218 and the respective opposing surface of the rotor component 214 and that transport the bearing fluid found in the sealing gap 232 towards the interior in the direction of the axial section of the bearing gap 220. Another sealing gap 234, which additionally acts as a fluid reservoir, is provided adjoining the radial section of the bearing gap 220. The sealing gap 234 is part of a gap that is defined by the outside diameter of the cylindrical part of the rotor component 214 and the inside diameter of the first bearing part 216. A recirculation channel 228 is provided in the rotor component 214, the recirculation channel connecting the respective open ends of the bearing gap 220 to each other. This embodiment of the spindle motor is characterized by the small number of necessary components. The other components of the spindle motor, such as the drive system and the holding piece for the storage disks, are not illustrated in FIG. 3.

The recirculation channel is preferably inclined by 5-15 degrees with respect to the rotational axis. Alternatively, the recirculation channel can also be aligned largely parallel to the rotational axis 46. The bearing grooves of the axial bearing 26, 226 preferably run from the radially inner bearing bore to the radially outer region of the capillary seal 34. Both the axial bearing patterns 26, 226 as well as the pumping patterns of the pumping seals 36, 236, 237 are preferably formed on the surface of the rotor component 14, 114a, 214. The pumping patterns of the pumping seals 36, 236 extend in a radial direction again preferably from the radially inner region of the bearing bore next to the shaft to the region of the sealing gap 32, 232. In addition or as an alternative, an axially extending pumping seal 237 may be disposed in the region of the sealing gap 232, as illustrated in FIG. 3.

Figure 4:
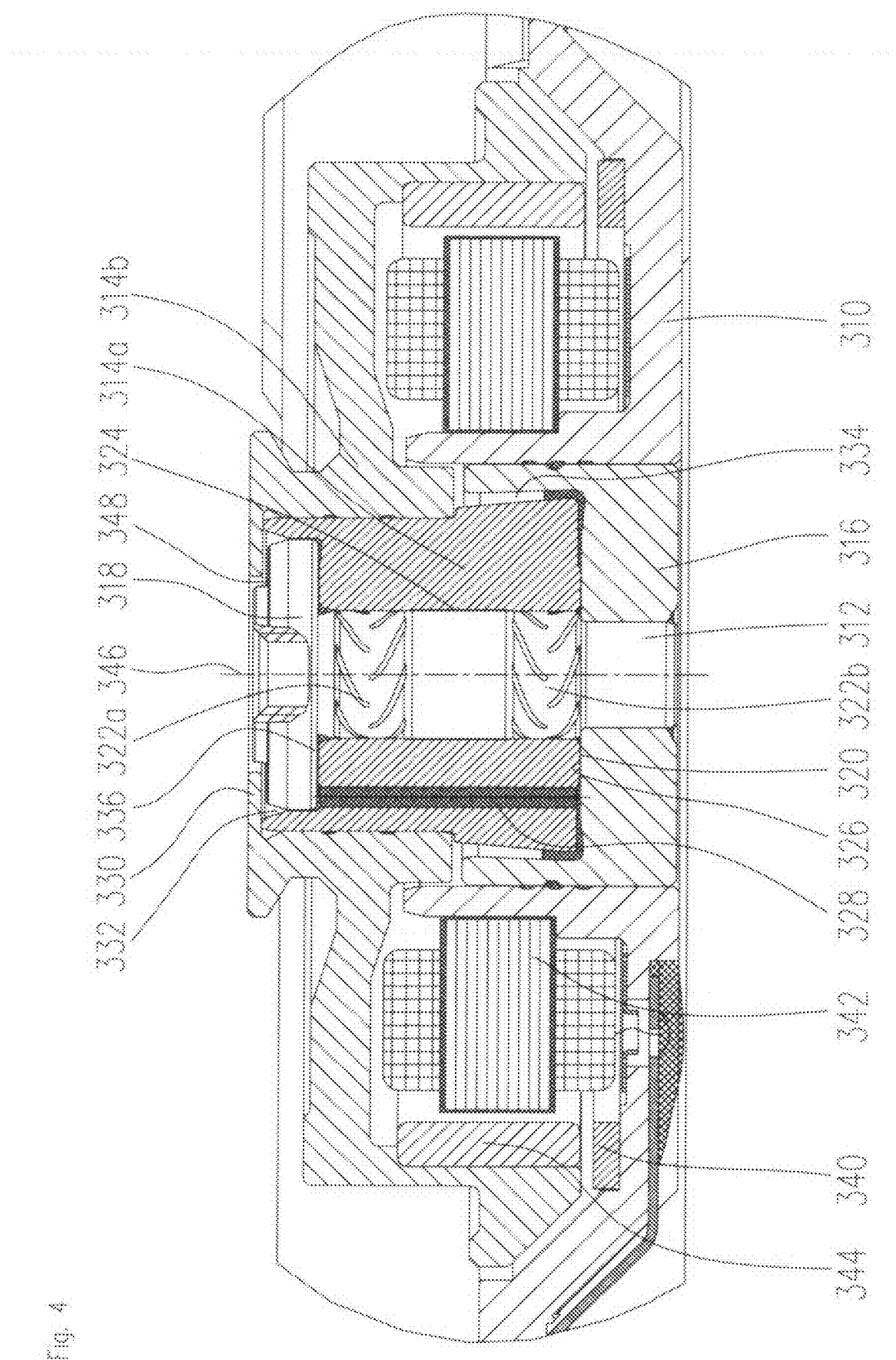
FIG. 4 shows a section through a fourth embodiment of the spindle motor according to the invention.

FIG. 4 shows a further embodiment of a spindle motor according to the invention having a baseplate 310 in which a first bearing part 316 is accommodated. The first bearing part 316 comprises a central opening in which a shaft 312 is fixed. The shaft 312 has a step that acts as a stopper and rests on the surface of the bearing part 316. The step enables the axial distance between the two bearing parts 316 and 318 to be very precisely and reproducibly adjusted. At an upper end of the stationary shaft 312, a second bearing part 318 is disposed that is preferably integrally formed with the shaft 312 as one piece. The spindle motor comprises a multipart rotor component that has an inner rotor component 314a which is disposed in a space formed by the shaft 312 and the two bearing parts 316, 318, rotatable with respect to the shaft. The upper bearing part 318 is accommodated in an annular recess in the rotor component 314a. Adjoining surfaces of the shaft 312, the rotor component 314a and the bearing parts 316, 318 are separated from one another by a bearing gap open at both ends 320 that is filled with a bearing fluid, such as bearing oil. The rotor component 314*a* is enclosed by an outer, cup-shaped rotor component 314*b* that carries at its inside circumference an annular permanent magnet 344 forming part of the electromagnetic drive system. A stator arrangement 342 is disposed on the baseplate 310, the stator arrangement lying opposite the permanent magnet 344.

The inner rotor component 314*a* has a hollow cylindrical bore at whose inside circumference two cylindrical bearing surfaces are formed that are separated by a circumferential groove 324 lying in between. These bearing surfaces enclose the stationary shaft 312 at a distance of only a few micrometers while forming the bearing gap 320 and are provided with grooved patterns, so that together with the respective opposing bearing surfaces of the shaft 312, they form two fluid dynamic radial bearings 322*a* and 322*b*.

A radially extending section of the bearing gap 320 adjoins the bearing gap in the region of the lower radial bearing 322*b*, the radially extending section of the bearing gap 320 separating the radially extending bearing surfaces of the rotor component 314*a* and the corresponding opposing bearing surfaces of the bearing part 316 from one another. The bearing surfaces of the above-mentioned components form a fluid dynamic axial bearing 326 that is marked in a well-known manner by spiral-shaped grooved patterns that are formed on one or both bearing surfaces.

A sealing gap 334 proportionally filled with bearing fluid adjoins the radial section of the bearing gap 320 in the region of the axial bearing 326, the sealing gap 334 being formed by opposing surfaces of the rotor component 314*a* and the bearing part 316 and sealing the lower end of the bearing gap. The sealing gap 334 comprises a radially extending section wider than the bearing gap 320 that merges into a tapered, almost axially extending section that is defined by an outer circumferential surface of the rotor component 314*a* and an inner circumferential surface of the bearing part 316. The sealing gap 334 further acts as a fluid reservoir and serves to compensate filling tolerances, loss of bearing fluid through evaporation and thermal expansion of the bearing fluid.

The rotor component 314*a* at the other end of the bearing gap 320 is designed such that it forms a radially extending surface that, together with a corresponding opposing surface of the bearing part 318, forms a narrow gap whose width is wider than the width of the bearing gap 320 in the region of the radial bearing. In the region of this gap, a dynamic pumping seal 336 is provided that is marked by suitable pumping patterns taking the form of spiral grooves on the surfaces of the rotor component 314*a* or the bearing part 318 respectively and that seals the fluid bearing system at this end of the bearing gap. On the other side of the pumping seal 336, a sealing gap 332 having a tapered cross-section is provided that extends substantially axially and is defined by the surfaces of the rotor component 314*a* and the bearing part 318. The sealing gap 332 is covered by an annular cover 330 that is formed as part of the outer rotor component 314*b*. Together with an end face of the bearing part 318, the cover 330 forms a labyrinth seal 348 to provide an additional seal for the sealing gap 332.

To ensure continuous flushing of the bearing system with bearing fluid, a recirculation channel 328, such as an axial bore, is disposed in the rotor component 314*a*. The recirculation channel 328 connects a section of the sealing gap 334 radially outside the axial bearing 326 to a radially extending section of the bearing gap radially outside the dynamic pumping seal 336.

Since the spindle motor has only one fluid dynamic axial bearing 326 that exerts a force in the direction of the second bearing part 318, a corresponding counterforce or preload force has to be provided that keeps the bearing system in axial balance. For this purpose, a ferromagnetic ring 340 is disposed on the baseplate 310, the ferromagnetic ring 340 lying axially opposite the rotor magnet 344 axial and being magnetically attracted by the rotor magnet 344. This magnetic force of attraction acts in opposition to the force of the axial bearing 326 and keeps the bearing axially in balance.

Figure 5:
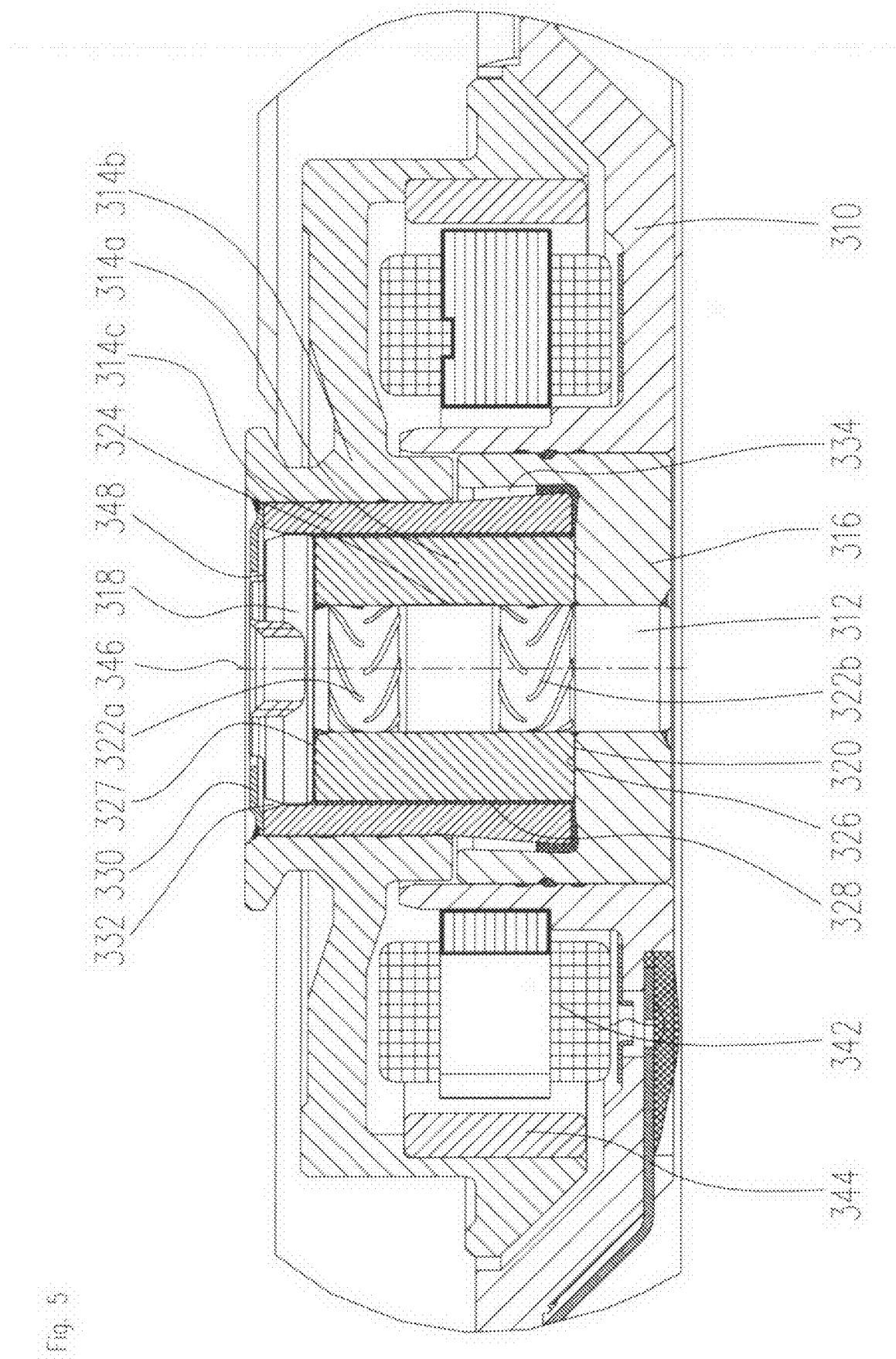
FIG. 5 shows a section through a fifth embodiment of the spindle motor according to the invention.

In FIG. 5, a modified embodiment of the spindle motor is shown that differs in various ways from the spindle motor in FIG. 4.

The first way in which it differs from the spindle motor in FIG. 4 is that the rotor component consists of three parts: an inner, sleeve-shaped rotor component 314*a*, a similarly sleeve-shaped rotor component 314*c* enclosing the first component 314*a* and the outer rotor component 314*b*. The inner rotor component illustrated in FIG. 4 is basically formed in two pieces and consists of the components 314*a* and 314*c*. The recirculation channel 328 is formed between the two rotor components 314*a* and 314*c*, taking the form, for example, of a channel-shaped groove at the outside circumference of component 314*a* or at the inside circumference of component 314*c*.

Another difference is in the design of the shaft 312 that no longer has a step in the region of the lower bearing part 316, but rather is perfectly cylindrical.

The upper sealing gap 332 that extends between an inside circumference of the rotor component 314*c* and an outside circumference of the bearing part 318 is covered by a cover 330, which, however, is formed as a separate, annular component. The cover 330 is fixed to the rotor component 314*c* or the outer rotor component 314*b* respectively. A capillary seal 348 is formed between the cover 330 and the end face of the bearing part 318, just as in the embodiment according to FIG. 4.

A further important difference in the bearing of FIG. 5 is that instead of an upper pumping seal a second axial bearing 327 is now provided. This axial bearing 327 is formed by an end face of the rotor component 314*a* and an opposing bearing surface of the bearing part 318. The axial bearing is marked by grooved patterns and forms a counter bearing to the lower axial bearing 326. The two axial bearing 326 and 327 operate in opposition to one another and keep the bearing in axial balance, making a magnetic preload, as provided in FIG. 4, no longer necessary.

Figure 6:
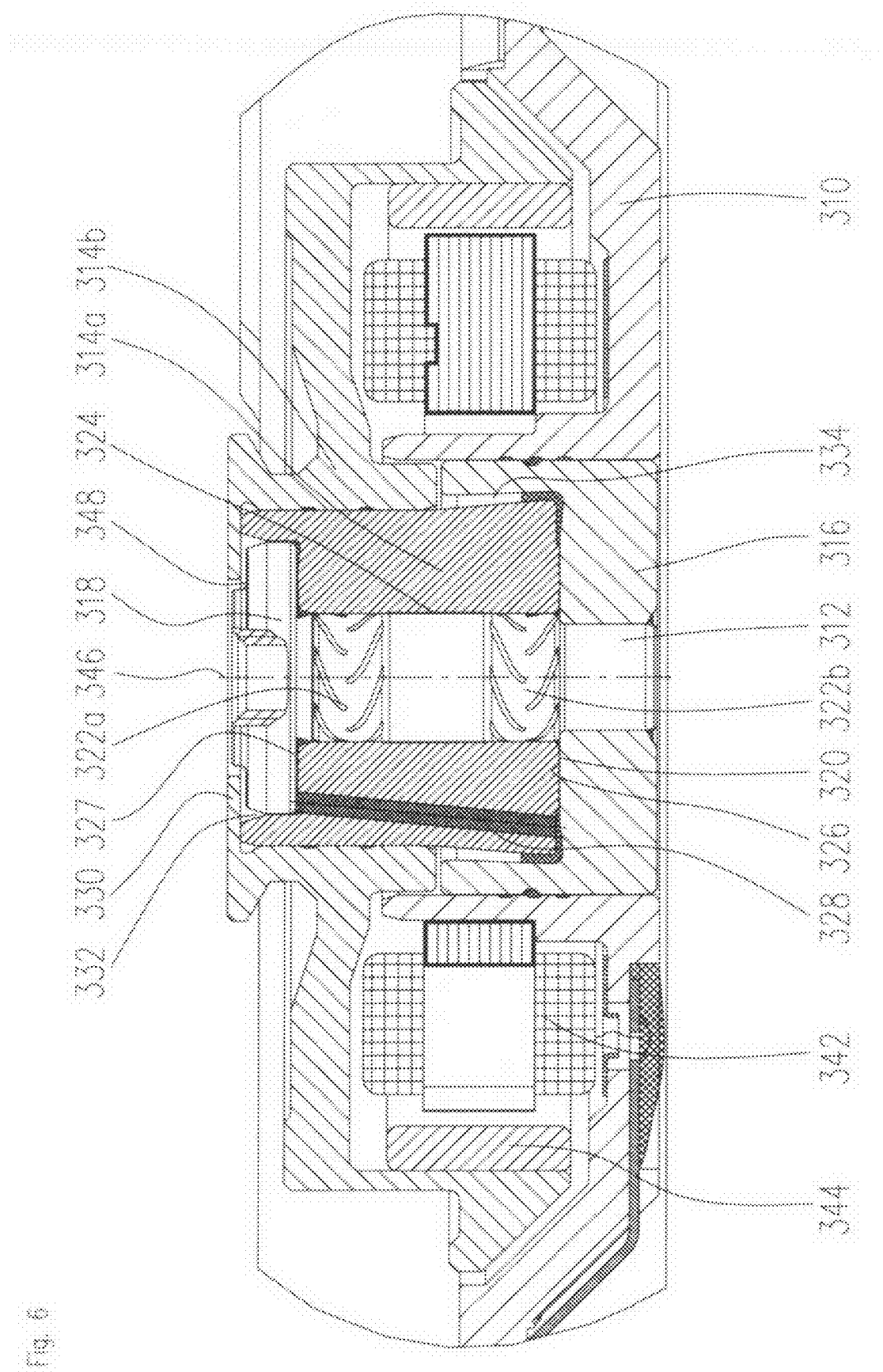
FIG. 6 shows a section through a sixth embodiment of the spindle motor according to the invention.

FIG. 6 shows an embodiment of a spindle motor that is very similar to the embodiment of FIG. 4. The first difference between the spindle motor according to FIG. 6 and the spindle motor according to FIG. 4 is that the recirculation channel 328 is not made parallel to the rotational axis 346, but rather inclined at an angle of approximately 5 degrees to the rotational axis 346. The recirculation channel 328 thus connects a region of the lower sealing gap 334 to a radially extending region of the bearing gap radially outside an upper fluid dynamic axial bearing 327. The fluid dynamic axial bearing 327 acts in opposition to the lower fluid dynamic axial bearing 326 and constitutes a second difference to the spindle motor according to FIG. 4 in which only a lower fluid dynamic axial bearing was provided. Due to the two fluid dynamic axial bearings 326 and 327, no magnetic preload is necessary for the spindle motor according to FIG. 6.

Figure 7:
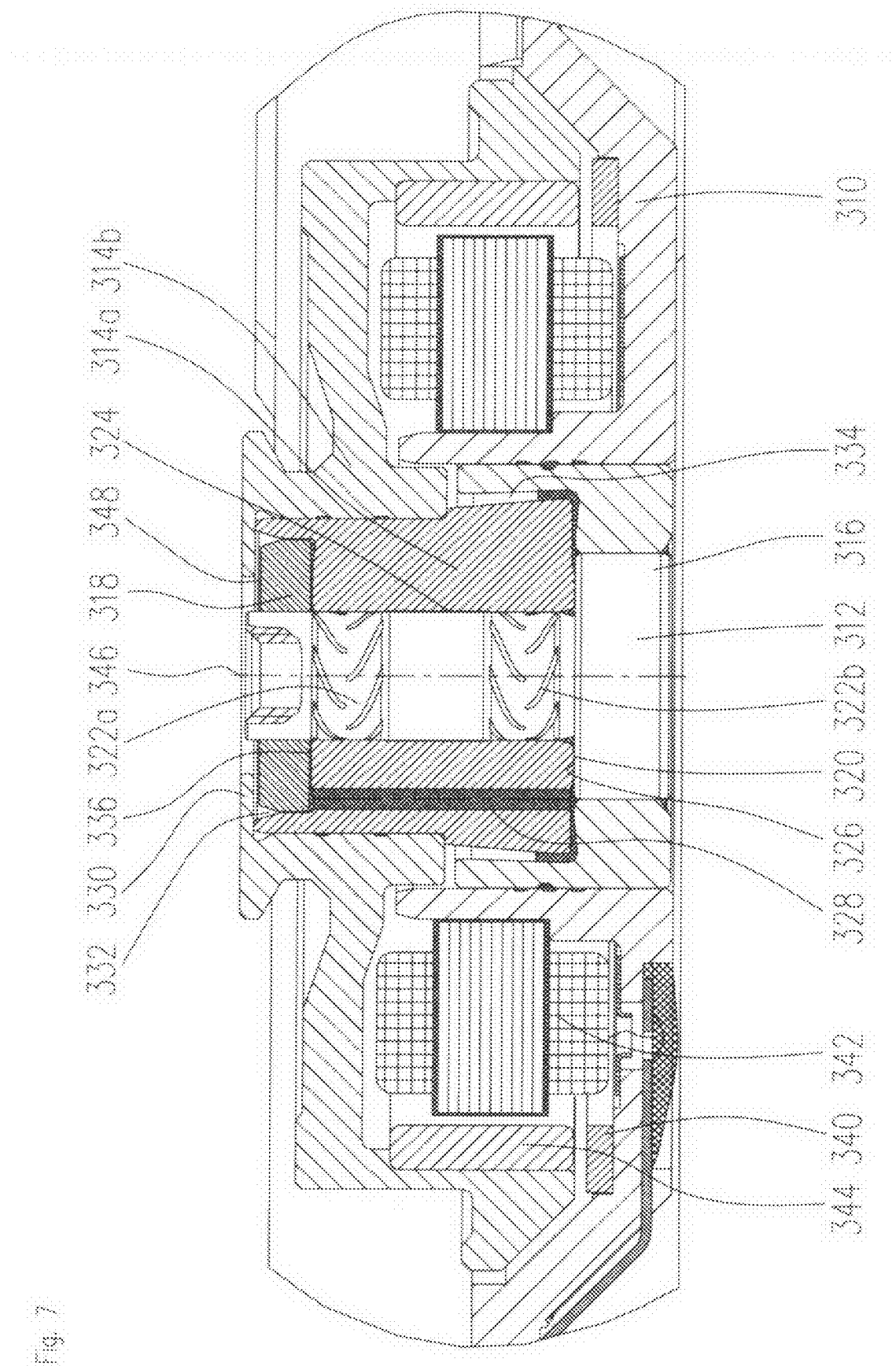
FIG. 7 shows a section through a seventh embodiment of the spindle motor according to the invention.

FIG. 7 shows a spindle motor that is likewise very similar to the spindle motor of FIG. 4. The spindle motor according to FIG. 7 comprises a greatly widened lower shaft end having a large diameter, which is inserted into the lower bearing part 316. The wider foot end of the shaft ensures greater stiffness. The inner end face of the widened section of the shaft 312 together with an end face of the rotor component 314*a* now forms the axial bearing 326 as well as parts of the radial section of the sealing gap 334. Moreover, the upper bearing part 318 is not formed integrally with the shaft, but rather as an annular part fixed separately to the end of the shaft 312. In contrast to the spindle motor of FIG. 6, for example, no upper axial bearing is provided but rather the sealing effect of the sealing gap 332 in this region is supported by a pumping seal 336 that is disposed between the end face of the rotor component 314*a* and of the bearing part 318.

A magnetic preload that acts in the opposite direction to the force of the axial bearing 326 is generated by a ferromagnetic ring 340 that lies opposite the rotor magnet 344 and attracted by this magnet.

Figure 8:
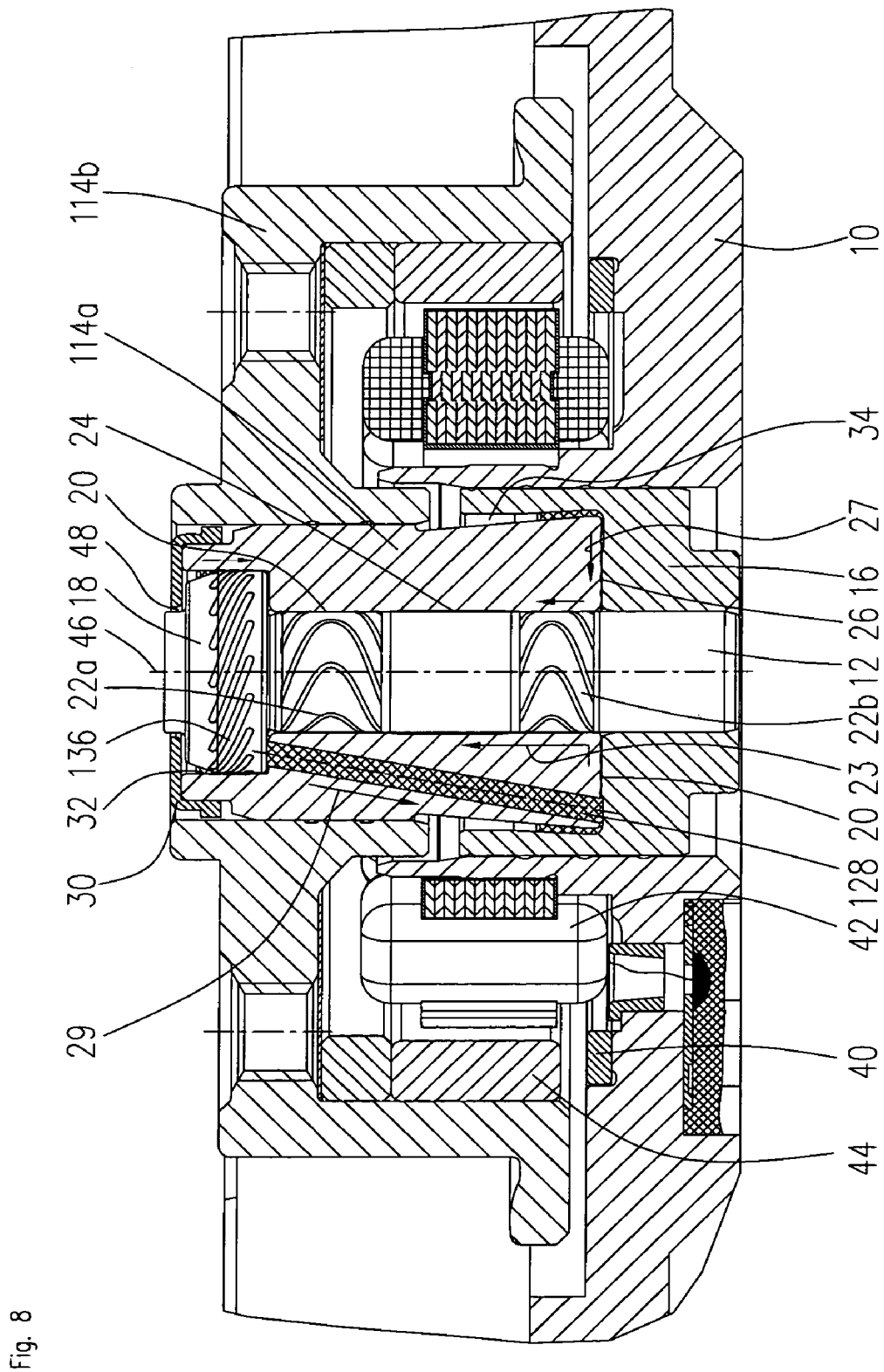
FIG. 8 shows a section through an eighth embodiment of the spindle motor according to the invention.

FIG. 8 shows a section through a spindle motor whose construction corresponds substantially to the spindle motor of FIG. 2. Thus the basic description of the spindle motors of FIGS. 1 and 2 applies to the spindle motor of FIG. 8, identical components or components having the same functions being indicated by the same reference numbers.

As in the spindle motor of FIG. 2, a bearing part 18 is also disposed at the upper end of the shaft 12 that is formed integrally with the shaft 12 as one piece. Moreover, a pumping seal 136 for sealing the sealing gap 32 is provided that is disposed between an outside circumference of the bearing part 18 and an inside circumference of a recess in the bearing bush 114*a*. The pumping patterns of the pumping seal 136 that pumps in an axial direction into the interior of the bearing are preferably disposed on the inside circumference of the bearing bush 114*a*. Because the pumping seal 136 is disposed between axially extending surfaces, the diameter of the bearing part 18 can be decreased, by means of which the diameter of the annular gap between the underside of the bearing part 18 and an opposing surface of the bearing bush 114*a* is also decreased.

A recirculation channel 128 is provided in the bearing bush 114*a*, the recirculation channel 128 starting at the radially extending annular gap between the underside of the bearing part 18 and an opposing surface of the bearing bush 114*a* runs at an angle of approximately 10 degrees to the rotational axis 46 and connects the topside of the bearing to the underside and leads into a radially outer region of the lower axial bearing 26. The recirculation channel 128 thus ends outside the axial bearing gap 20 between the axial bearing gap 20 and the sealing gap 34.

Figure 9:
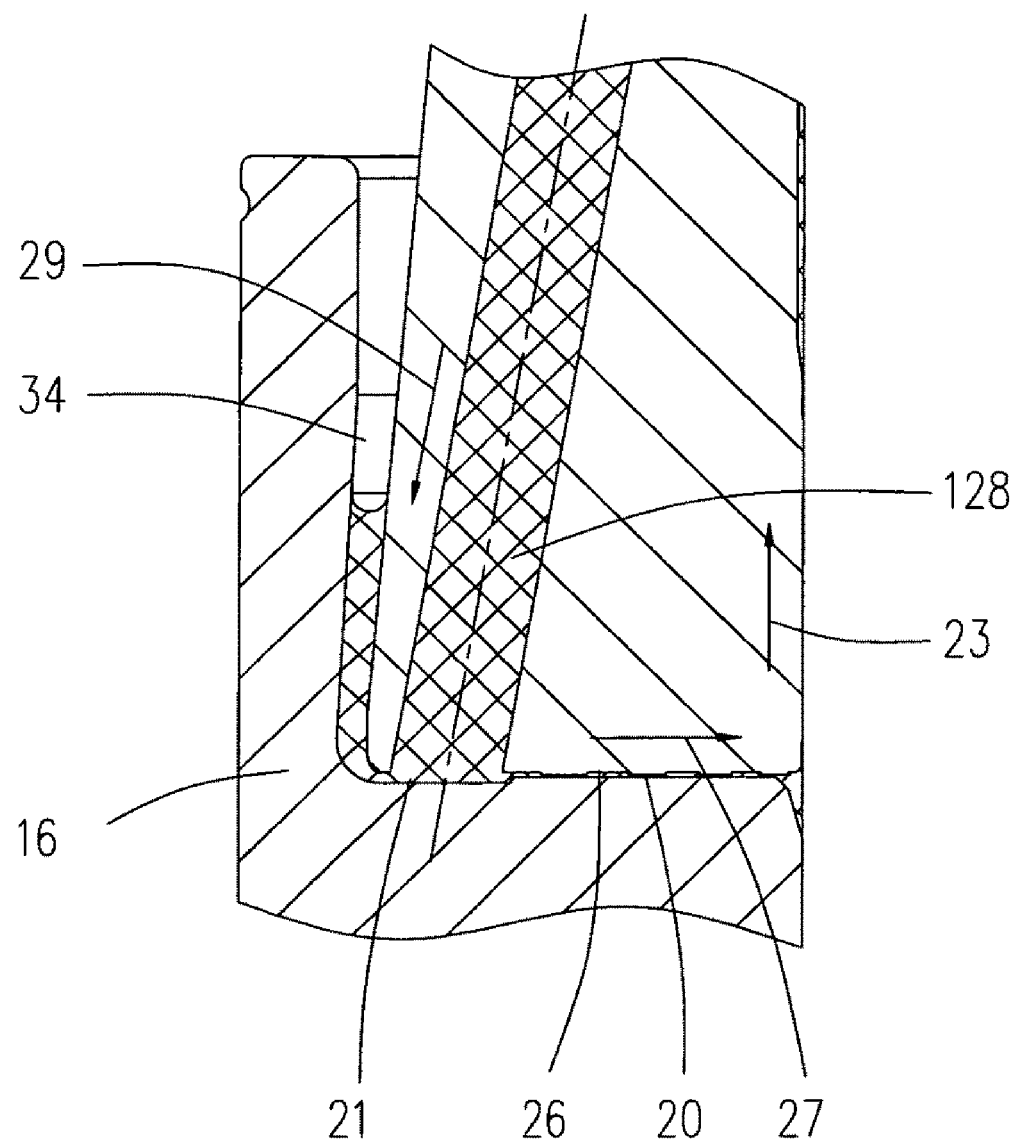
FIG. 9 shows an enlarged view of the end region of the recirculation channel located radially outside the axial bearing.

The mouth region of the recirculation channel 128 is illustrated in FIG. 9 in an enlarged view. It can be seen that the recirculation channel 128 ends radially outside the bearing gap 20 of the axial bearing 26. In the mouth region of the recirculation channel 128, the bearing gap 20 widens to form a gap 21 which then merges radially outwards into the sealing gap 34. Due to the inclined arrangement of the recirculation channel 128 in the rotating bearing part 114*a*, a centrifugal force is exerted on the bearing fluid found in the recirculation channel 128. This centrifugal force transports the bearing fluid in the direction of arrow 29, i.e. starting from the axial gap in the region of the upper bearing part 18 through the recirculation channel 128 to gap 21 in the region of the lower bearing part 16. Gap 21 has a larger gap width than the bearing gap 20, so as to allow the bearing fluid to flow unimpeded out of the recirculation channel 128. The axial bearing 26 has bearing patterns that transport the bearing fluid in the direction of the shaft 12 in the direction shown by arrow 27. The radial bearings 22*a* and 22*b* generate an overall pumping effect upwards in the direction of arrow 23 to bearing part 18, by means of which the bearing fluid is then transported to the opening in the recirculation channel 128 where the cycle starts over again. The bearing fluid thus flows in the recirculation channel 128 in the same direction as the net pumping direction of the bearing, i.e. of the axial bearing 26 and the two radial bearings 22*a*, 22*b*. The pumping seal 136 lies outside this cycle and pumps into the interior of the bearing in the direction of the recirculation channel 128.

The lower radial bearing 22*b* is made distinctly asymmetric and all in all pumps the bearing fluid upwards, whereas the upper radial bearing 22*a* is made symmetric or slightly asymmetric.

The pumping action on the bearing fluid generated by the centrifugal force within the recirculation channel is preferably substantially larger than the overall pumping action on the bearing fluid in the same direction generated by the thrust bearing and the two radial bearings. Because of the relatively large pumping action generated by the inclined recirculation channel, a directed pumping action generated by the axial bearing or the two radial bearings may not be necessary to maintain circulation of the bearing fluid within the bearing gap. In this case, the thrust bearing and/or the two radial bearings can comprise bearing grooves that are almost symmetrical and generate a pumping action of about the same strength in both directions of the bearing gap.

Any air trapped in the bearing fluid that is found within the recirculation channel 128 is transported upwards by the centrifugal effect in the direction of the radial gap located between the bearing bush 114*a* and the bearing part 18. Due to the continuous increase in pressure brought about by the pumping seal 136 seen from the upper sealing gap 32 in the direction of the interior of the bearing, the air is subsequently forced out of the bearing via the upper sealing gap 32.

The bearing patterns of the axial bearing 26 are preferably given a spiral shape and formed in the bearing bush 114*a*, and extend continuously from the inner bore next to the shaft 12 to the outer rim of the bearing bush 114*a*.

A spindle motor as illustrated in FIGS. 8 and 9 is preferably used for driving 2.5 inch hard disk drives. This kind of spindle motor has, for example, a shaft diameter of 2.5 mm and a bearing bush 114*a* diameter of approximately 6 mm. The bearing patterns of the axial bearing 26 have a depth, for example, of 15 μm and, when the motor is in operating status, the bearing gap 20 in the region of the axial bearing 26 has a width, for example, of 10 to 15 μm. The width of the axial bearing gap is defined by the fly-height of the bearing. The gap width of the gap 21 in the mouth region of the recirculation channel 128 is, for example, 30 μm.

The gap width of gap 21 is preferably greater than or equal to the fly-height (width of the axial bearing gap in operation) plus the depth of the axial bearing patterns. Thanks to the inclined recirculation channel 128, the circulation of bearing fluid in the bearing gap is positively supported. This also applies accordingly to the spindle motors illustrated in FIGS. 1-3 and 6.

FIG. 10 shows a section through a spindle motor whose construction corresponds substantially to the spindle motor of FIG. 1. Thus the basic description of the spindle motor of FIG. 1 applies to the spindle motor of FIG. 10, identical components or components having the same functions being indicated by the same reference numbers.

The spindle motor illustrated in FIG. 10 has an upper bearing part 18 disposed on the shaft 12. The upper bearing part 18, encircled by the bearing gap 20 filled with bearing fluid, is seated in a recess in the rotor component 14. Together with an adjoining surface of the rotor component 14, a lower surface of the bearing part 18 forms an axial bearing 25 that operates in opposition to the axial bearing 26 on the underside of the bearing. The axial bearing 25 is marked by grooved patterns that are disposed on the surface of the bearing part 18 and/or on the corresponding surface of the rotor component 14. The grooved patterns generate a pumping effect on the bearing fluid in the bearing gap 20 that is directed towards the interior of the bearing, i.e. in the direction of the radial bearings 22a, 22b.

A further bearing part 19 adjoins the upper end face of the bearing part 18, the bearing part 19 being fixedly connected to the rotor component 14. The two bearing parts 18, 19 are separated from each other by a radially extending gap in whose course the dynamic pumping seal 36 is disposed. The pumping seal 36 is marked by pumping patterns pumping radially outwards and taking the form of spiral grooves on the surfaces of bearing part 18 and/or bearing part 19 and seals the fluid bearing system at this end. The gap in the region of the pumping seal 36 extends radially inwards, changes its course in an axial direction and merges into an axially extending sealing gap 32 preferably having a tapered cross-section. The sealing gap 32 is defined by the opposing surfaces of the shaft 12 and the bearing part 19. The sealing gap 32 is located at the smallest diameter of the bearing and may be covered by an annular cover 30. The cover 30 is held in an annular groove 38 of the rotor component 14 and fixed there, for example, by being bonded, pressed in or (laser) welded. The cover 30, together with the end of the shaft 12, forms a labyrinth seal 48, by means of which the exchange with air and thus the evaporation of bearing fluid is decreased.

IDENTIFICATION REFERENCE LIST

10 Baseplate
12 Shaft
14; 114a, 114b Rotor component
16 First bearing part
18 Second bearing part
19 Bearing part
20 Bearing gap
21 Gap
22a, 22b Radial bearing
24 Groove
25 Axial bearing
26 Axial bearing
27 Direction of arrow
28; 128 Recirculation channel
29 Direction of arrow
30, 130 Cover
32 Sealing gap
34 Sealing gap
36, 136 Pumping seal
38 Annular groove
40 Ferromagnetic ring
42 Stator arrangement
44 Magnet
46 Rotational axis
48 Labyrinth seal
50 Housing cover
52 Tapped hole (shaft)
54 Holding piece
56 Tapped hole (rotor component)
58 Storage disks
60 Spacer
210 Baseplate
212 Shaft
214 Rotor component
216 First bearing part
218 Second bearing part
220 Bearing gap
222a, 222b Radial bearing
226 Axial bearing
228 Recirculation channel
232 Sealing gap
234 Sealing gap
236 Pumping seal
237 Pumping seal
246 Rotational axis
310 Baseplate
312 Shaft
314, 314a, 314b Rotor component
314c Rotor component
316 First bearing part
318 Second bearing part
320 Bearing gap
322a, 322b Radial bearing
324 Groove
326 Axial bearing
327 Axial bearing
328 Recirculation channel
330 Cover
332 Sealing gap
334 Sealing gap
336 Pumping seal
340 Ferromagnetic ring
342 Stator arrangement
344 Magnet
346 Rotational axis
348 Labyrinth seal

The invention claimed is:

1. A spindle motor having a fluid dynamic bearing system comprising:
    a stationary shaft (12; 212; 312) that is held directly or indirectly in a baseplate (10, 210; 310),
    a rotor component (14, 114a; 214; 314a-c) rotatably supported with respect to the shaft about a rotational axis (46; 246; 346),
    a bearing gap (20, 220; 320) open at both ends filled with a bearing fluid that separates the adjoining surfaces of the shaft (12; 212; 312), the rotor component (14, 114a; 214; 214a-c) and at least one first bearing part (16, 216; 316) from one another, a first radial bearing (22a, 222a; 322a) and a second radial bearing (22b, 222b; 322b) formed between the opposing axially extending bearing surfaces of the shaft (12; 212; 312) and the rotor component (14, 114a; 214; 314a-c),
    an axial bearing (26, 226; 326) formed between the opposing radially extending bearing surfaces of the rotor component (14, 114a; 214; 314a-c) and the first bearing part (16, 216; 316) connected to the baseplate,
    a recirculation channel (28; 128; 228; 328) filled with bearing fluid that connects the remote regions of the bearing to each other, and
    an electromagnetic drive system (42, 44; 342, 244) for driving the rotor component, and
    characterized in that the recirculation channel (28, 128; 228) ends in a gap (21) radially outside of the bearing gap (20) of the axial bearing (26), the width of the gap (21) being greater than the width of the bearing gap (20).

2. A spindle motor according to claim 1, characterized in that the rotor component consists of an inner, sleeve-shaped rotor component (114a; 314a) and an outer cup-shaped rotor component (144b; 314b).

3. A spindle motor according to claim 2, characterized in that the inner, sleeve-shaped rotor component (314a) is enclosed by a further, sleeve-shaped rotor component (314c) on which the outer cup-shaped rotor component (314b) is disposed.

4. A spindle motor according to claim 1, characterized in that it only contains one rotating, mechanical rotor component (14; 214) taking the form of a hub/bearing bush arrangement.

5. A spindle motor according to claim 1, characterized in that the first bearing part (216) is integrally formed with the shaft (212) as one piece.

6. A spindle motor according to claim 1, characterized in that a second bearing part (18; 318) is integrally formed with the shaft (12) as one piece.

7. A spindle motor according to claim 1, characterized in that the rotor component (14, 114a; 214; 314a-c) has surfaces that are fashioned such that, together with surfaces of the second bearing part (18; 218; 318), they form a sealing gap (32; 232; 332) of a capillary gap seal.

8. A spindle motor according to claim 1, characterized in that the rotor component (14, 114a; 214; 314a-c) has surfaces that are fashioned such that, together with surfaces of a first bearing part (16; 216; 316), they form a sealing gap (34; 234; 334) of a capillary gap seal.

9. A spindle motor according to claim 1, characterized in that the recirculation channel (328) is disposed in the rotor component (314a) or between the rotor components (314a, 314c) and connects the sealing gap (334) radially outside the axial bearing (226) to a section of the bearing gap (320) located radially outside a dynamic pumping seal.

10. A spindle motor according to claim 1, characterized in that the recirculation channel (28, 128; 228) is disposed at an incline to the rotational axis (46), which, on rotation of the rotor component, causes a centrifugal force to be exerted on the bearing fluid held in the recirculation channel, the centrifugal force transporting the bearing fluid through the recirculation channel (28, 128; 228) in the direction of arrow (29).

11. A spindle motor according to claim 10, characterized in that the recirculation channel (28, 128; 228) is inclined at an angle of 5 to 15 degrees with respect to the rotational axis (46).

12. A spindle motor according to claim 10, characterized in that the centrifugal force exerted on the bearing fluid due to the inclined recirculation channel (28, 128; 228) acts in the same direction as a pumping force exerted on the bearing fluid due to an overall pumping effect of the axial bearing (26; 126; 226; 326) and the radial bearings (22a, 22b; 122a, 122b; 222a, 222b; 322a, 322b).

13. A spindle motor according to claim 12, characterized in that the pumping force generated by the centrifugal force is directed to the axial bearing (26).

14. A spindle motor according to claim 12, characterized in that the centrifugal force is at least twice as big as the force exerted on the bearing fluid due to the overall pumping effect of the axial bearing (26) and the radial bearings (22a, 22b).

15. A spindle motor according to claim 1, characterized in that a dynamic pumping seal (36; 236; 336) is formed between opposing radially extending surfaces of the rotor component (14, 114; 214; 314) and a second bearing part (18; 218; 318) connected to the shaft.

16. A spindle motor according to claim 15, characterized in that the dynamic pumping seal (36; 236; 336) is formed between a radially extending end face of the rotor component (14, 114a; 214; 314a) and an adjoining radially extending end face of the second bearing part (18; 218; 318).

17. A spindle motor according to claim 15, characterized in that the dynamic pumping seal (36; 236; 336) is disposed substantially perpendicular and the sealing gap (32; 232; 332) of the gap seal substantially parallel to the rotational axis (46; 246; 346).

18. A spindle motor according to claim 1, characterized in that the baseplate (10; 310) has a ferromagnetic ring (40; 340) that lies axially opposite a rotor magnet (44; 344) of the electromagnetic drive system and is magnetically attracted by this magnet and that they generate a magnetic force that is directed in the opposite direction to a bearing force generated by the axial bearing (26; 326).

19. A spindle motor according to claim 18, characterized in that the electromagnetic drive system comprises a stator arrangement (42; 342) which is disposed at an axial offset with respect to the rotor magnet (44; 344) and generate a magnetic force that is directed in the opposite direction to a bearing force generated by the axial bearing (26; 326).

20. A spindle motor according to claim 1, characterized in that adjacent surfaces of the second bearing part (18) and the rotor component 14 form a further axial bearing (25).

21. A spindle motor according to claim 1, characterized in that a further bearing part (19) connected to the rotor component adjoins the second bearing part (18), a pumping seal (36) being disposed between the two bearing parts (18, 19) and a sealing gap being disposed between the bearing part (19) and the shaft (12).

22. A spindle motor having a fluid dynamic bearing system comprising:
a stationary shaft (12; 212; 312) that is held directly or indirectly in a baseplate (10, 210; 310),
a rotor component (14, 114a; 214; 314a-c) rotatably supported with respect to the shaft about a rotational axis (46; 246; 346),
a bearing gap (20; 220; 320) open at both ends filled with a bearing fluid that separates the adjoining surfaces of the shaft (12; 212; 312), the rotor component (14, 114a; 214; 214a-c) and at least one first bearing part (16, 216; 316) from one another, a first radial bearing (22a, 222a; 322a) and a second radial bearing (22b, 222b; 322b) formed between the opposing axially extending bearing surfaces of the shaft (12; 212; 312) and the rotor component (14, 114a; 214; 314a-c),
an axial bearing (26, 226; 326) formed between the opposing radially extending bearing surfaces of the rotor component (14, 114a; 214; 314a-c) and the first bearing part (16, 216; 316) connected to the baseplate,
a recirculation channel (28; 128; 228; 328) filled with bearing fluid that connects the remote regions of the bearing to each other, and
an electromagnetic drive system (42, 44; 342, 244) for driving the rotor component,
characterized in that the recirculation channel (28, 128; 228) ends in a gap (21) radially outside of the bearing gap (20) of the axial bearing (26), and
further characterized in that the width of the gap (21) is greater than or equal to the width of the bearing gap (20) of the axial bearing (26) plus the depth of the bearing patterns of the axial bearing (26).

23. A spindle motor having a fluid dynamic bearing system comprising:
a stationary shaft (12; 212; 312) that is held directly or indirectly in a baseplate (10, 210; 310),
a rotor component (14, 114a; 214; 314a-c) rotatably supported with respect to the shaft about a rotational axis (46; 246; 346),
a bearing gap (20; 220; 320) open at both ends filled with a bearing fluid that separates the adjoining surfaces of the shaft (12; 212; 312), the rotor component (14, 114a; 214; 214a-c) and at least one first bearing part (16, 216; 316) from one another, a first radial bearing (22a, 222a; 322a) and a second radial bearing (22b, 222b; 322b)

formed between the opposing axially extending bearing surfaces of the shaft (12; 212; 312) and the rotor component (14, 114*a*; 214; 314*a-c*), an axial bearing (26, 226; 326) formed between the opposing radially extending bearing surfaces of the rotor component (14, 114*a*; 214; 314*a-c*) and the first bearing part (16, 216; 316) connected to the baseplate, a recirculation channel (28; 128; 228; 328) filled with bearing fluid that connects the remote regions of the bearing to each other, and an electromagnetic drive system (42, 44; 342, 244) for driving the rotor component, and a sealing gap (32; 332) for sealing the bearing gap (20, 220; 320) which is covered by an annular cover (30, 130; 330) connected to the rotor component (14; 114*a*; 314*c*) that, together with the second bearing part (18; 318), forms a labyrinth seal (48; 348).

24. A spindle motor according to claim 23, characterized in the annular cover (330) is formed by the rotor component.

25. A spindle motor according to claim 23, characterized in that the sealing gap (32) is formed between an inner circumferential surface of the cover (130) and an outer circumferential surface of the second bearing part (18).

26. A spindle motor according to claim 23, characterized in that the sealing gap (32; 332) is formed between an inner circumferential surface/end face of the rotor component (14, 114*a*; 214; 314*a*; 314*c*) and an outer circumferential surface/end face of the second bearing part (18; 218; 318).

27. A spindle motor according to claim 23, characterized in that the sealing gap (34; 234; 334) is formed between an outer circumferential surface of the rotor component (14, 114*a*; 214; 314*a*; 314*c*) and an inner circumferential surface of the first bearing part (16; 216; 316).

28. A spindle motor according to claim 23, characterized in that surfaces of the rotor component (14, 144*a*; 214) or the cover (130) and the second bearing part (18; 218) forming the sealing gap (32; 232) extend substantially parallel to the rotational axis (46; 246) or are inclined at an acute angle to the rotational axis.

29. A spindle motor according to claim 23, characterized in that surfaces of the rotor component (14, 114*a*; 214; 314*a*; 314*c*) and the first bearing part (16; 216; 316) forming the sealing gap (34; 234; 334) extend substantially parallel to the rotational axis (46; 246; 346) or are inclined at an acute angle to the rotational axis.

30. A hard disk drive comprising a spindle motor for rotatably driving at least a storage disk, and means for writing on and reading data from the storage disk, the spindle motor having a fluid dynamic bearing system and comprising:

a stationary shaft (12; 212; 312) that is held directly or indirectly in a baseplate (10, 210; 310), a rotor component (14, 114*a*; 214; 314*a-c*) rotatably supported with respect to the shaft about a rotational axis (46; 246; 346), a bearing gap (20, 220; 320) open at both ends filled with a bearing fluid that separates the adjoining surfaces of the shaft (12; 212; 312), the rotor component (14, 114*a*; 214; 214*a-c*) and at least one first bearing part (16, 216; 316) from one another, a first radial bearing (22*a*, 222*a*; 322*a*) and a second radial bearing (22*b*, 222*b*; 322*b*) formed between the opposing axially extending bearing surfaces of the shaft (12; 212; 312) and the rotor component (14, 114*a*; 214; 314*a-c*), an axial bearing (26, 226; 326) formed between the opposing radially extending bearing surfaces of the rotor component (14, 114*a*; 214; 314*a-c*) and the first bearing part (16, 216; 316) connected to the baseplate, a recirculation channel (28; 128; 228; 328) filled with bearing fluid that connects the remote regions of the bearing to each other, and an electromagnetic drive system (42, 44; 342, 244) for driving the rotor component, characterized in that the recirculation channel (28, 128; 228) ends in a gap (21) radially outside of the bearing gap (20) of the axial bearing (26), and further characterized in that the width of the gap (21) is greater than or equal to the width of the bearing gap (20) of the axial bearing (26) plus the depth of the bearing patterns of the axial bearing (26).

31. A spindle motor having a fluid dynamic bearing system comprising:

a stationary shaft (12; 212; 312) that is held directly or indirectly in a baseplate (10, 210; 310), a rotor component (14, 114*a*; 214; 314*a-c*) rotatably supported with respect to the shaft about a rotational axis (46; 246; 346), a bearing gap (20, 220; 320) open at both ends filled with a bearing fluid that separates the adjoining surfaces of the shaft (12; 212; 312), the rotor component (14, 114*a*; 214; 214*a-c*) and at least one first bearing part (16, 216; 316) from one another, a first radial bearing (22*a*, 222*a*; 322*a*) and a second radial bearing (22*b*, 222*b*; 322*b*) formed between the opposing axially extending bearing surfaces of the shaft (12; 212; 312) and the rotor component (14, 114*a*; 214; 314*a-c*), an axial bearing (26, 226; 326) formed between the opposing radially extending bearing surfaces of the rotor component (14, 114*a*; 214; 314*a-c*) and the first bearing part (16, 216; 316) connected to the baseplate, a recirculation channel (28; 128; 228; 328) filled with bearing fluid that connects the remote regions of the bearing to each other, and an electromagnetic drive system (42, 44; 342, 244) for driving the rotor component, characterized in that the recirculation channel (28, 128; 228) is disposed in the rotor component (14; 114*a*; 214) and connects a sealing gap (34) radially outside the axial bearing (26) to a section of the bearing gap (20) adjacent to a dynamic pumping seal (136).

* * * * *